US009626844B2

(12) United States Patent
Kelaher et al.

(10) Patent No.: US 9,626,844 B2
(45) Date of Patent: Apr. 18, 2017

(54) SERVICE INDICATORS WITH MINIMAL LIGHT SOURCES

(71) Applicant: Lenovo Enterprise Solutions (Singapore) Pte. Ltd., Singapore (SG)

(72) Inventors: Daniel P. Kelaher, Holly Springs, NC (US); Justin S. Thaler, Rougemont, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 196 days.

(21) Appl. No.: 14/573,703

(22) Filed: Dec. 17, 2014

(65) Prior Publication Data

US 2016/0180659 A1 Jun. 23, 2016

(51) Int. Cl.
*B60Q 1/04* (2006.01)
*G08B 5/36* (2006.01)

(52) U.S. Cl.
CPC .................................... *G08B 5/36* (2013.01)

(58) Field of Classification Search
CPC ........................................................ G08B 5/36
USPC ............... 340/326, 815.42–815.65, 524, 525
See application file for complete search history.

(56) References Cited

U.S. PATENT DOCUMENTS 3,532,873 A * 10/1970 Batson ................. B60Q 11/005 235/27
6,288,700 B1 * 9/2001 Mori .................... G02B 6/0033 340/815.42
7,944,612 B2 5/2011 Robinson
8,710,754 B2 4/2014 Baddela et al.
2005/0144508 A1 6/2005 McKean et al.
2008/0320117 A1 12/2008 Johnsen et al.
2011/0089866 A1 4/2011 Trotter et al.
2013/0187559 A1 7/2013 Wu
2016/0170565 A1 * 6/2016 Ilmonen et al. ...... G06F 3/0428 340/815.4

FOREIGN PATENT DOCUMENTS

WO 9714072 A1 4/1997

OTHER PUBLICATIONS

Ohno, "Color Rendering and Luminous Efficacy of White LED Spectra", Proc. of SPIE, vol. 5530, 2004, pp. 88-98.

* cited by examiner

*Primary Examiner* — Brent Swarthout
(74) *Attorney, Agent, or Firm* — Jason Friday; Andrew M. Calderon; Roberts, Mlotkowski, Safran, Cole & Calderon, P.C.

(57) ABSTRACT

A service indicator lighting system which minimizes the active lighting sources for designation of a failed or otherwise identified component is provided. The system includes an array of service indicators arranged in a grid of columns and rows. The system further includes a single light source provided at each row and each column of the grid of columns and rows. The light source for each column illuminates light of a first color and the light source in each row illuminates light of a second color different than the first color. The system further includes a plurality of light pipes intersecting at each service indicator of the array of service indicators such that light illuminated from a single light source in each row and each column is combined together at a respective intersection forming a third color.

20 Claims, 3 Drawing Sheets

SERVICE INDICATORS WITH MINIMAL LIGHT SOURCES

FIELD OF THE INVENTION

The invention relates to a service indicator lighting system and, more particularly, to a service indicator lighting system which minimizes the active lighting sources for designation of a failed or otherwise identified component.

BACKGROUND

Computer systems typically include service indicators to signify a component failure. These service indicators require an individual light source (e.g., light emitting source such as an LED) to illuminate the indicator in case of a component failure. For large scale computing systems such as servers, each component may require an individual service indicator and, hence, a separate light source. For example, in conventional large computing systems, a front-mounted panel can include upwards of 65 or more lights, depending on the number of components that require monitoring. The use of so many light sources increases the cost of the system, by requiring additional light sources and associated circuitry, etc.

As computing systems evolve and include additional components, more service indicators are required. This, in turn, leads to the need for additional separate light sources for each of the added service indicators. This increases the cost of the product by requiring additional components and design time. For example, as the component count increases, so will the number of required LEDs, thus increasing the cost to design and manufacture the system. This will also require added space for all of the additional light sources. Also, due to space considerations, it is not possible to place the LEDs next to the correct component (e.g., memory DIMM slot) because there are too many components near the connector to place an LED on the board.

To overcome the space issue, many manufactures have adopted text or graphical displays to signify component failure. Although space savings can be realized, such text and graphical displays come at a considerable cost, with the need for additional engineering time and resources.

SUMMARY OF THE INVENTION

In an aspect of the invention, a system comprises an array of service indicators arranged in a grid of columns and rows. The system further comprises a single light source provided at each row and each column of the grid of columns and rows. The light source for each column illuminates light of a first color and the light source in each row illuminates light of a second color different than the first color. The system further comprises a plurality of light pipes intersecting at each service indicator of the array of service indicators such that light illuminated from a single light source in each row and each column is combined together at a respective intersection forming a third color.

In an aspect of the invention, a system comprises: an array of service indicators arranged in a grid of N number of columns and M number of rows; a single light source associated with each row and each column of the grid of N number of columns and M number of rows, wherein the light source associated with each column is a first color and the light source associated with each row is a second color; and a plurality of light pipes arranged in a grid pattern intersecting at each service indicator in the array of service indicators and corresponding to each single light source.

In an aspect of the invention, a system comprises: a plurality of service indicators arranged in columns and rows; a single light source of a first color provided in each column of the columns; a single light source of a second color provided in each row of the rows, the first color being different than the second color; a plurality of light pipes arranged in a grid pattern and intersecting at each service indicator of the array of service indicators, the plurality of light pipes being structured to transmit light from each single light source of the first color and each single light source of a second color to each intersection; and a management system which activates the single light source in a single identified column and a single identified row, which at its intersection, corresponds to an identified component represented by a service indicator in the array of service indicators.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF EMBODIMENTS OF THE INVENTION

The invention relates to a service indicator lighting system and, more particularly, to a service indicator lighting system which minimizes the active lighting requirements for designation of a failed or otherwise identified component. In more specific embodiments, the service indicator lighting system described herein includes an array or grid of service indicators arranged in rows and columns, with only a single light source, e.g., LED lights, required for each row and each column of the array or grid. A plurality of light pipes arranged in a grid pattern is used to transmit light from each light source to a particular service indicator corresponding to a respective component. The service indicator includes a color filter, allowing only the appropriate color light to pass.

In embodiments, each service indicator in the array or grid of service indicators will correspond to designation of a failed or otherwise identified component, which can be illuminated by a certain combination of a single light source in the corresponding row and column. Accordingly, by implementing the array or grid of service indicators, it is now possible to minimize the number of active light sources designating a failed component, compared to conventional systems. That is, it is no longer a requirement to have separate light sources for each service indicator. Also, the array or grid of service indicators described herein is scalable as systems add more components that require failure designation, while not requiring the use of a text or graphical display. In this way it is now possible to place indicator next to the correct component (e.g., memory DIMM slot).

Figure 1:
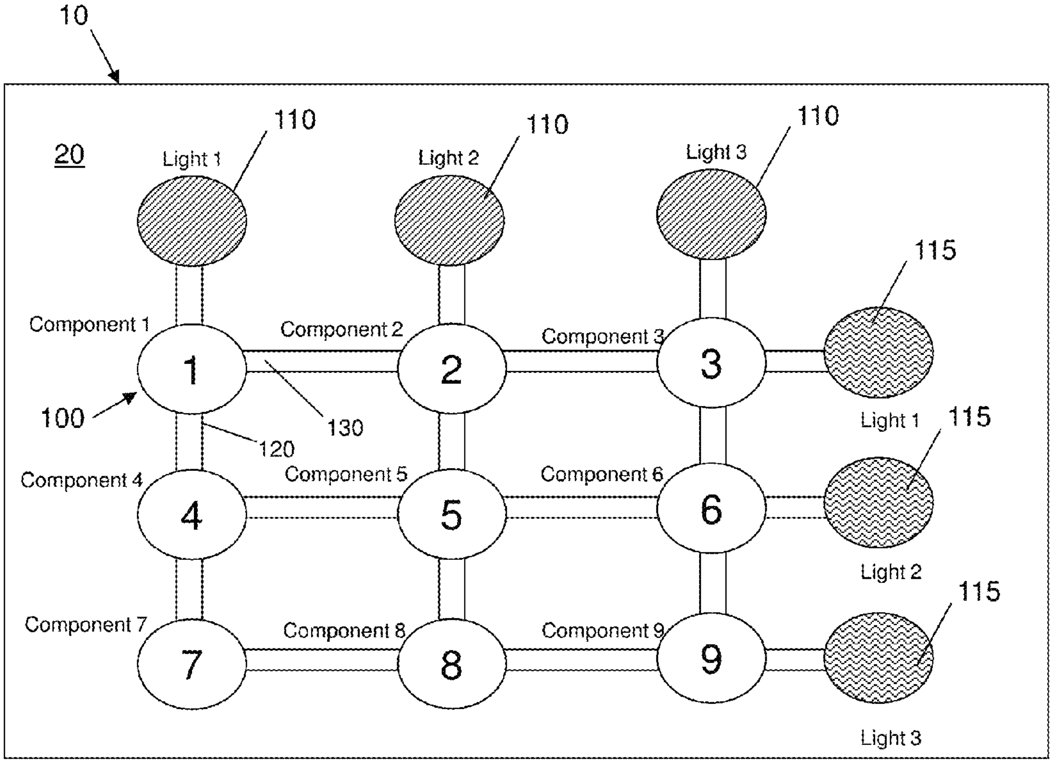
FIG. 1 shows an exemplary system comprising an array or grid of service indicators in accordance with aspects of the invention.

FIG. 1 shows an exemplary system comprising an array or grid of service indicators in accordance with aspects of the invention. In particular, the exemplary system 10 shown in FIG. 1 includes a 3×3 array or grid of service indicators 100 provided on a printed circuit board (PCB) or panel 20. In embodiments, each of the service indicators labeled 1-9 in the array of service indicators 100 corresponds to a particular component within a system, e.g., component 1 through component 9. As described with regard to FIG. 2, each of the service indicators 1-9 can include, amongst other features, a lens to allow for consistent light emission and a color filter. In contrast to conventional systems, the service indicators 100 are not active light sources.

Although FIG. 1 is described as a 3×3 array or grid of service indicators, it should be understood by those of skill in the art that the array or grid of service indicators can be scalable to any number of service indicators (and hence a corresponding number of monitored components). For example, the array or grid of service indicators 100 can be an array or grid comprising N column(s)×N row(s) or M column(s)×N row(s), where N and M designate a number of indicators in a column or row. In this example, N≠M. In this way, the service indicators can be scaled to any number of components provided with a system, while minimizing the need for a corresponding amount of light sources.

Still referring to FIG. 1, each column will include a single active light source of a first color designated at reference numeral 110; whereas, each row will include a single active light source of a second color, designated at reference numeral 115. In embodiments, the first color and the second color are different colors, that when combined together will form a third color, different from the first color and the second color. The active light source 110, 115 can be any active lighting system such as LED lighting. Although the present invention is described with regard to LED light sources, other active lighting systems are also contemplated herein.

FIG. 1 further shows a light pipe assembly comprising a plurality of vertical light pipes 120 and a plurality of horizontal light pipes 130. The plurality of vertical light pipes 120 and the plurality of horizontal light pipes 130 will transmit light originating from each active light source 110, 115 to a respective service indicator 1-9 in a respective column and row (e.g., at an intersection point). More specifically, the vertical light pipes 120 and horizontal light pipes 130 will transmit light originating from a single light source 110 in the column of light sources and a single light source 115 in the row of light sources to illuminate a respective service indicator 1-9 at the intersection between the activated light sources. By way of example, and as further described with regard to FIG. 3, at the intersection point of the individual selected light sources 110, 115, the two separate colors will be combined together to illuminate, in a different color, a respective service indicator. The illumination of a respective service indicator 1-9 will indicate a failed or otherwise identified component.

In embodiments, the light pipes 120, 130 are optical components corresponding in number to the rows and columns in the array or grid. For example, in a 3×3 array, there would be six light pipes, each corresponding to a respective light source. In embodiments, the light pipes 120, 130 are physical structures which transport or distribute the light originating from the light sources 110, 115 for illumination of each respective service indicator 1-9. The light pipes 120, 130 can be hollow structures that contain the light with a reflective lining, or transparent solids that contain the light by total internal reflection. For example, the light pipes 120, 130 can be a fiber optic cable.

In alternative embodiments, the light pipes 120, 130 can be molded plastic light tubes that direct light from the active light sources 110, 115, e.g., LEDs, to a respective service indicator. These light pipes 120, 130 can be molded into complex shapes that use either gentle curving bends as in an optic fiber or have sharp prismatic folds which reflect off the angled corners. In embodiments, the multiple light pipes 120, 130 can be molded from a single piece of plastic, permitting easy assembly since the multiple light pipes 120, 130 are all part of a single rigid component that can snap into place.

Figure 2:
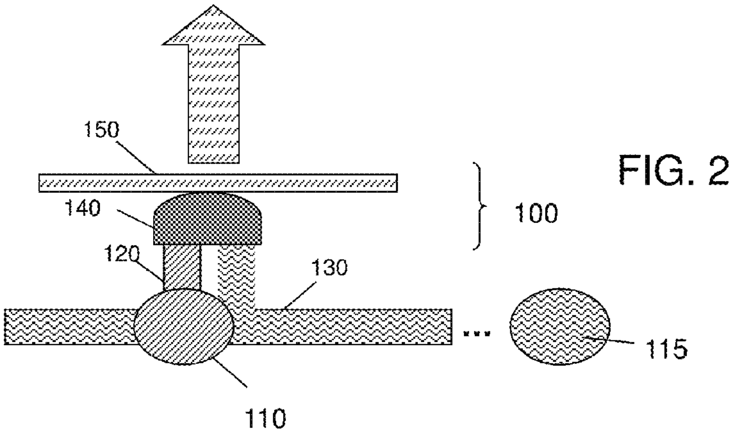
FIG. 2 shows an exploded cross sectional view of a single service indicator with respective light pipes and light sources in accordance with aspects of the invention.

FIG. 2 shows an exploded cross sectional view of a single service indicator 100 with respective light pipes 120, 130 and light sources 110, 115. In embodiments, the service indicator 100 includes a frosted lens 140, which allows for consistent light emission. The frosted lens 140 will receive light at an intersection point of the light pipes 120, 130. The single service indicator 100 further includes a light filter 150, which prevents colors of the individual light sources 110, 115 to be illuminated through the service indicator 100; instead, the light filter 150 will transmit light within only a narrow range of wavelengths corresponding to the combined colors of the two different individual light sources 110, 115. The light filter 150 can be a bandpass filter which can be adjustable to different light bandwidths, depending on the colors of the transmitted light received from the individual light sources 110, 115. Although FIG. 2 shows the light pipe making a 90° turn, it would be understood by those of ordinary skill in the art that the light pipes 120, 130 can include a slit which allows the light to bleed from the light pipes into the frosted lens 140.

By way of illustrative example, assuming that the light source 110 is red and the light source 115 is green, then at the point of intersection, e.g., frosted lens 140, the lights would intersect and combine into yellow. So, in this example, the light filter 150 will be a yellow filter, allowing the yellow light to pass through the service indicator 100, which may be indicative of a component failure. As should be understood by those of skill in the art, none of the other service indicators 100 will illuminate due to the light filter 150 blocking each color, individually, emitted from the individual light sources 110, 115. Of course, it should also be understood by those of ordinary skill in the art that any number of different light colors and respective filters can be combined together for alternative illumination colors, indicative of a component failure.

Figure 3:
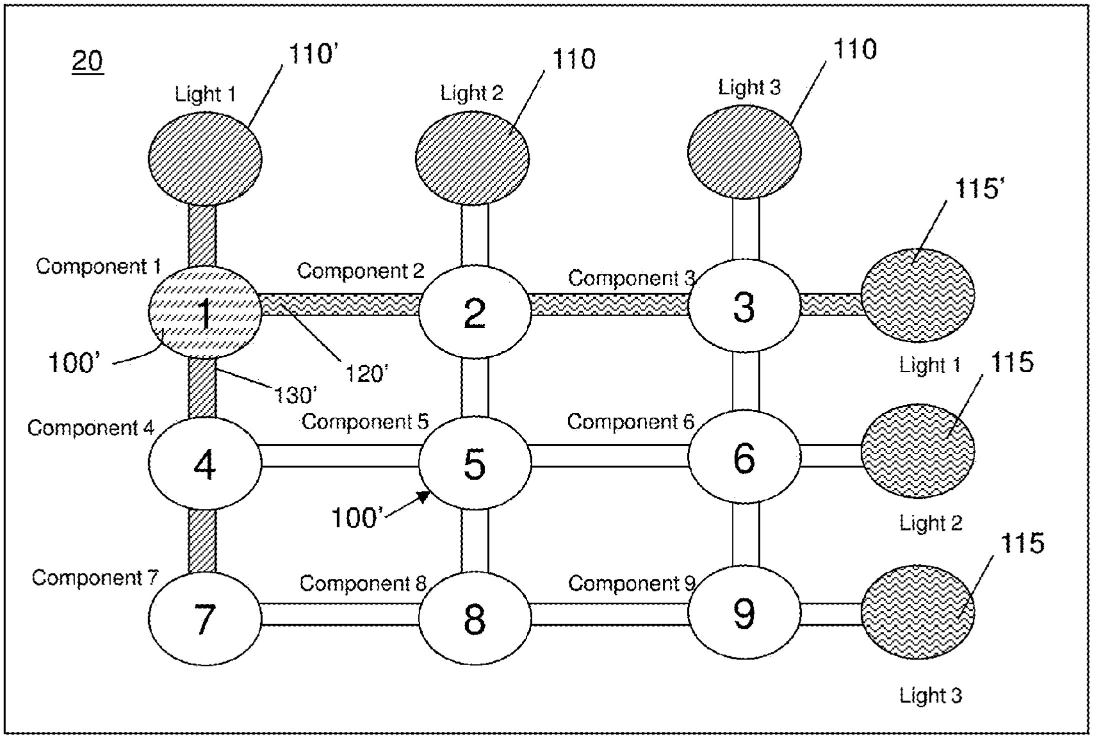
FIG. 3 shows an exemplary implementation of a single failed or otherwise identified component in accordance with aspects of the present invention.

FIG. 3 shows an exemplary implementation of a single failed component in accordance with aspects of the present invention. As shown representatively in FIG. 3, the service indicator 100' is illuminated, designating a failed or otherwise identified component, e.g., component 1. By way of more specific example, as the system detects a component failure, e.g., component 1, the respective light sources 110' and 115' in the corresponding column and row will be illuminated. The light will be transmitted through the respective light pipes 120', 130' intersecting with the service indicator 100' associated with the failed or otherwise identified component. At the intersection of the respective light pipes 120', 130, the light of each respective light source, e.g., light sources 110' and 115', will be combined together resulting in a different color which passes through the filter and hence illuminates the service indicator 100'. The illumination of the service indicator 100' of a different color will then signify a failed or otherwise identified component, e.g., component 1. This same process can be used to signify a failure of any other component in the array or grid.

Figure 4:
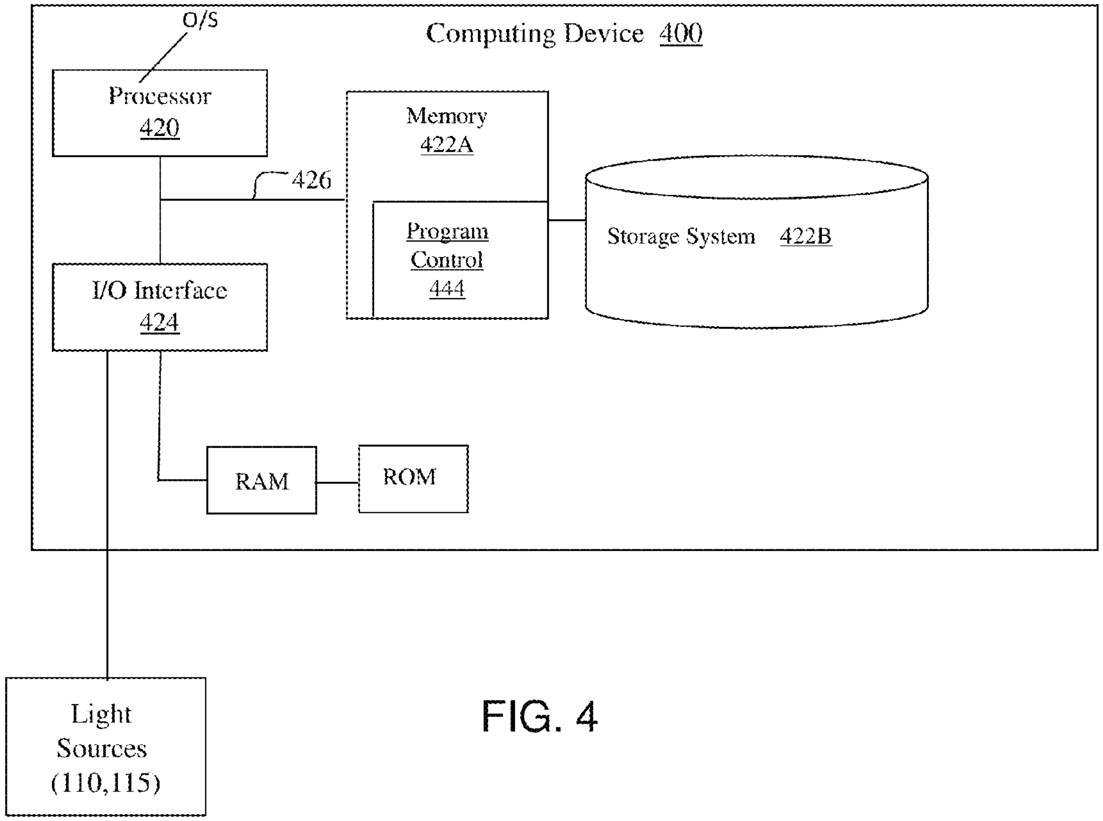
FIG. 4 shows a computing device which implements systems and processes in accordance with aspects of the invention.

FIG. 4 shows a computing device 400 which can implement the management processes herein, as software or hardware or combinations thereof (hereinafter referred to as management system). As should be understood, the management system can provide the logic to map the grid or array of service indicators 100 and respective light sources 110, 115 to a failed component. In embodiments, the management system can be a software product provided on tangible computer readable storage medium that can retain and store instructions for implementing the processes described herein. The computer readable storage medium is any non-transitory, physical storage medium such as a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, an optical device, or and any suitable combination of the foregoing. The computer readable storage medium, as used herein, is not to be construed as being transitory signals per se.

By way of more specific example, the computing device 400 can include a look-up table which associates a failed component to a particular service indicator 100, and respective lights 110, 115 which intersect with the service indicator 100. By knowing this relationship, the computing device 400, e.g., management system, can provide an activation signal to a respective light source 110, 115 in a particular column and row which intersects with the service indicator 100 associated with the failed or otherwise identified component. In this way, the identified and activated light sources will illuminate, providing light through the respective light pipes 120, 130 to be combined at the intersection point of the service indicator 100 associated with the failed or identified component. The service indicator 100 can then be illuminated with the combined light color of the respective light sources 110, 115, which is indicative of a component failure.

In embodiments, the computing device 400 includes memory 422A and/or storage system 422B. The memory 422A and/or storage system 422B can store the map of the grid or array of service indicators 100 and respective lights 110, 115 for identification of a failed component. In embodiments, the memory 422A can include local memory employed during execution of program code (e.g., management system), bulk storage, and cache memories which provide temporary storage of at least some program code in order to reduce the number of times code must be retrieved from bulk storage during execution. On the other hand, the storage system 422B can be any tangible, physical storage device such an electronic storage device, a magnetic storage device, an optical storage device, an electromagnetic storage device, a semiconductor storage device, or any suitable combination of the foregoing. The storage system 422B can also store the management system as a software or hardware product.

In embodiments, processor 420 executes computer program code 444 (e.g., processes associated with the management system), which can be stored in memory 22A and/or storage system 422B. The program control 444 can be implemented as separate dedicated processors or a single or several processors to provide the functionality described herein. While executing the computer program code, the processor 420 can read and/or write data to/from memory 422A, storage system 422B and/or I/O interface 424. The I/O interface 424 will control the lights 110, 115, though the program control 444. The program code can execute the processes of the invention as already described herein. The bus 426 provides a communications link between each of the components in computing device 400. In addition, the computing device 400 includes random access memory (RAM), a read-only memory (ROM), and an operating system (O/S).

As should now be understood by those of skill in the art, by implementing the system described herein it is now possible to reduce the number of light sources needed in a PCB or other panel. By way of example, for nine (9) components, only six 6 light sources are now required (compared to nine light sources needed for a conventional system). Accordingly, by using the system described herein, a significant reduction in light sources be achieved at considerable product cost savings. In fact, the percentage cost savings increases as the number of indicators increases, since the function of the number of light sources saved is a square function: $x^2-2x$ (where x is representative of the number of components). Also, by arranging the light sources in a convenient area on the PCB or other panel, developers are provided with added flexibility to create better layouts. This, in turn, will minimize the cost of the system product through design by minimizing component costs and design time.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system, comprising:

an array of service indicators arranged in a grid of columns and rows;

a single light source provided at each row and each column of the grid of columns and rows, wherein the light source for each column illuminates light of a first color and the light source in each row illuminates light of a second color different than the first color;

a plurality of light pipes intersecting to form an intersection at each service indicator of the array of service indicators such that light illuminated from a single light source in each row and each column is combined together at a respective intersection forming a third color; and a one or more bandpass filters respectively located at the intersections of the plurality of light pipes at each of the service indicators, the bandpass filters each being structured to permit the third color to pass through to be illuminated by the respective service indicator.

2. The system of claim 1, wherein the light source in each row and each column is a light emitting diode (LED).

3. The system of claim 1, wherein the array of service indicators are non-light emitting sources.

4. The system of claim 1, wherein the each of the service indicators include a lens.

5. The system of claim 4, wherein the lens is a frosted lens.

6. The system of claim 1, wherein the light pipes are fiber optic cables.

7. The system of claim 1, wherein the light pipes are molded plastic light tubes that direct light from each light source to a respective service indicator in the array of service indicators.

8. The system of claim 1, further comprising a management system to activate an light source in a single identified column and a single identified row, which at an intersection thereof, corresponds to an identified component represented by a service indicator in the array of service indicators.

9. The system of claim 1, wherein the columns and rows are an equal number.

10. The system of claim 1, wherein the columns and rows are an unequal number.

11. A system, comprising:

an array of service indicators arranged in a grid of N number of columns and M number of rows;

a single light source associated with each row and each column of the grid of N number of columns and M number of rows, wherein the light source associated with each column is a first color and the light source associated with each row is a second color;

a plurality of light pipes arranged in a grid pattern intersecting to form an intersection at each service indicator in the array of service indicators and corresponding to each single light source; and a one or more bandpass filters respectively located at the intersections of the plurality of light pipes at each of the service indicators, the bandpass filters each being structured to permit a third color, which is a combination of the first color and the second color, to pass through to be illuminated the respective service indicator and to block the first color and the second color, individually, to prevent the first and second colors from being illuminated, individually, by the respective service indicator.

12. The system of claim 11, wherein the single light source associated with each row and each column of the grid of N number of columns and M number of rows is a light emitting diode (LED).

13. The system of claim 11, wherein the service indicators are non-light emitting sources.

14. The system of claim 11, wherein M≠N.

15. The system of claim 11, further comprising a management system to determine which light source in a single row and a single column of the grid of N number of columns and M number of rows is to be activated to illuminate a service indicator in the array of service indicators associated with an identified component.

16. A system, comprising:

a plurality of service indicators arranged in columns and rows;

a single light source of a first color provided in each column of the columns;

a single light source of a second color provided in each row of the rows, the first color being different than the second color;

a plurality of light pipes arranged in a grid pattern and intersecting to form intersections at each service indicator of the array of service indicators, the plurality of light pipes being structured to transmit light from each single light source of the first color and each single light source of a second color to each intersection;

a one or more bandpass filters respectively located at the intersections of the plurality of light pipes at each of the service indicators, the bandpass filters each being structured to permit a third color, which is a combination of the first color and the second color, to pass through to be illuminated the respective service indicator and to block the first color and the second color, individually, to prevent the first and second colors from be illuminated, individually, by the respective service indicator; and a management system which activates the single light source in a single identified column and a single identified row, which at its intersection, corresponds to an identified component represented by a service indicator in the array of service indicators.

17. The system of claim 16, wherein:

the single light source of the first color and the single light source of the second color are light emitting diodes (LED);

the service indicators are non-light emitting sources.

18. The system of claim 4, wherein the each of the lenses is located between the intersection of the plurality of the light pipes and the bandpass filter at the respective service indicator.

19. The system of claim 11, wherein the each of the service indicators includes a lens located between the intersection of the plurality of the light pipes and the bandpass filter at the respective service indicator.

20. The system of claim 18, wherein the lens is a frosted lens.

* * * * *